United States Patent [19]
Hoffman

[11] 4,136,641
[45] Jan. 30, 1979

[54] LIVESTOCK SORTING GATE

[76] Inventor: Herbert F. Hoffman, Platte, S. Dak. 57369

[21] Appl. No.: 779,738

[22] Filed: Mar. 21, 1977

[51] Int. Cl.² .................... A01K 29/00; E01F 13/00
[52] U.S. Cl. ................................................. 119/155
[58] Field of Search ............... 119/155, 98, 99, 20; 49/49, 58

[56] References Cited
U.S. PATENT DOCUMENTS

| 262,373 | 8/1882 | Cole | 119/155 |
|---|---|---|---|
| 2,050,527 | 8/1936 | Grabe | 119/155 |
| 3,072,099 | 1/1963 | Stevens | 119/155 |

*Primary Examiner*—Hugh R. Chamblee

*Attorney, Agent, or Firm*—Clarence A. O'Brien; Harvey B. Jacobson

[57] ABSTRACT

A livestock sorting gate having a chute forming a path for guiding animals toward a pair of pens disposed in opposite relation to one another laterally of the path formed by the chute for receiving animals being guided down the chute. Access to at least one of the pens is selectively blocked by a gate in the form of a parallel crank four-bar linkage disposed in the chute adjacent the pens. A motor, connected between an adjoining pair of three fence-portions pivotally joined together and anchored to fixed pivots for forming the cranks and connecting rod of the linkage, acts to vary the angle included between adjoining sections of the gate in order to swing the gate transversely of the path formed along the chute so as to achieve the desired blocking and unblocking of access to the pens.

9 Claims, 8 Drawing Figures

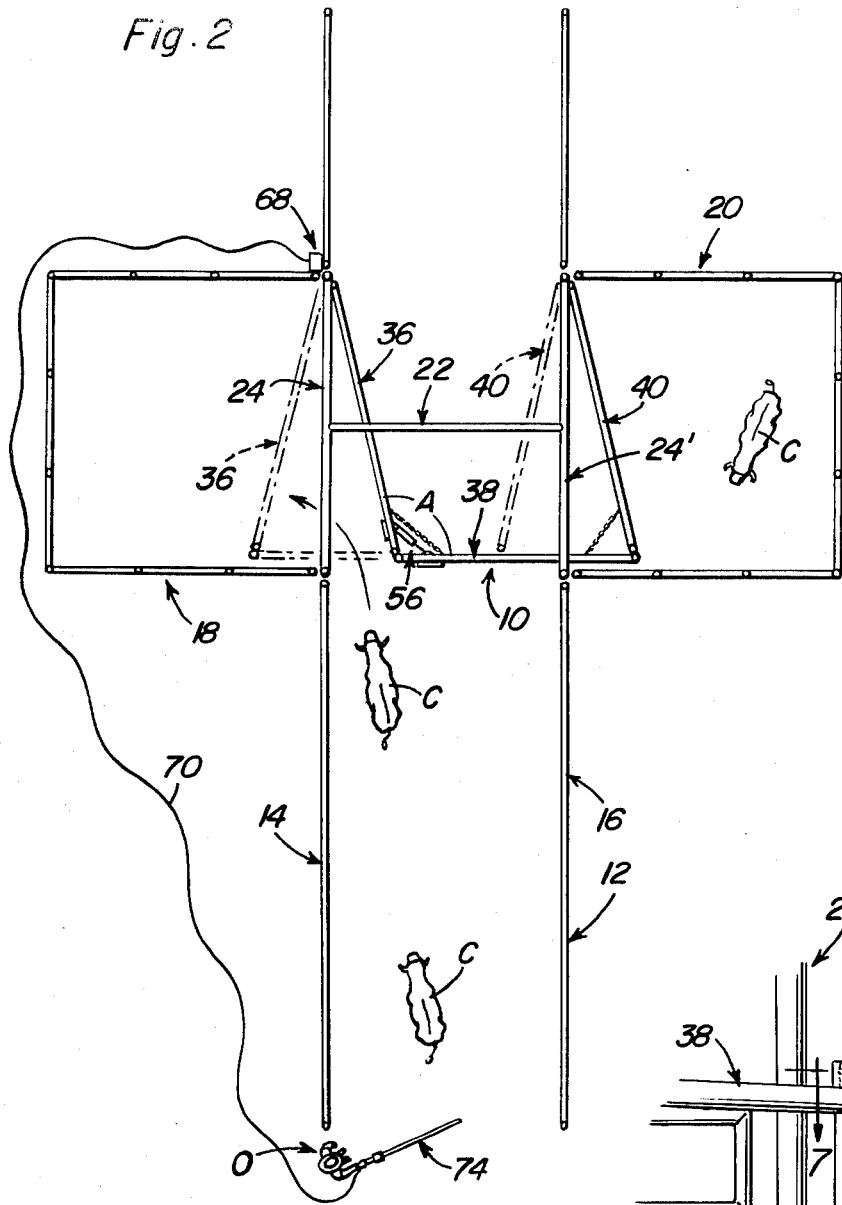
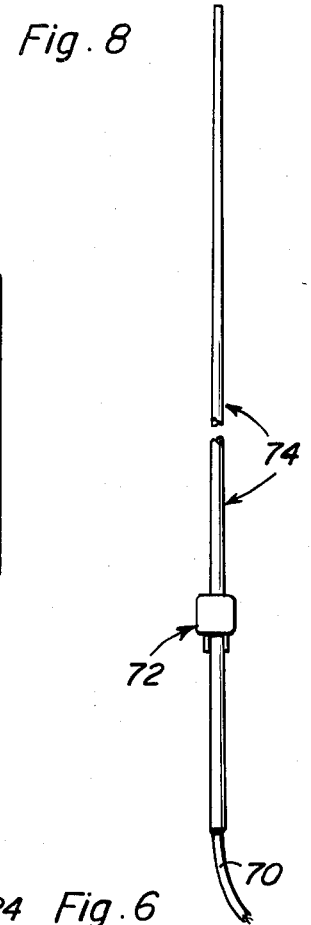
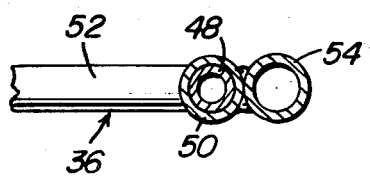
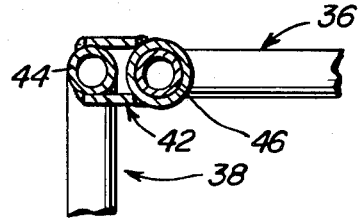
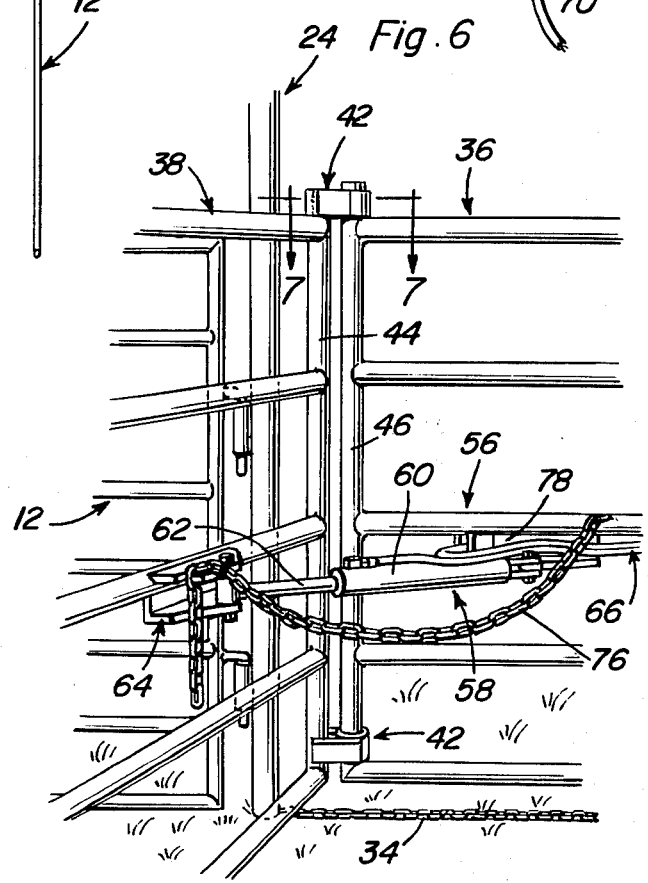

LIVESTOCK SORTING GATE

BACKGROUND OF THE INVENTION

1. Field of the Invention

This invention relates generally to the sorting of livestock, and particularly to a sorting gate which permits livestock to be directed into different pens by a single individual operating the gate by remote control as the individual drives the livestock down a chute associated with the sorting gate.

2. Description of the Prior Art

It has long been known to employ sorting gates to direct livestock into one of a plurality of pens for containing the animals as desired for various purposes. Examples of sorting gates previously proposed can be found in U.S. Pat. Nos. 182,688, issued Sept. 26, 1876, to A. Minor; U.S. Pat. No. 262,373, issued Aug. 8, 1882, to R. W. Cole; U.S. Pat. No. 2,504,214, issued Apr. 18, 1950, to W. C. Miller, et al.; and U.S. Pat. No. 3,072,099, issued Jan. 8, 1963, to G. M. Stevens.

Among difficulties encountered with prior art sorting gates are that they must necessarily be employed with rather narrow guide chutes, and are not conveniently controlled by an operator herding the animals down the guide chute toward the sorting gate.

SUMMARY OF THE INVENTION

It is an object of the present invention to provide a livestock sorting gate which can be employed with guide chutes of various widths.

It is another object of the present invention to provide a livestock sorting gate suited for remote operation so as to permit an operator to control the position of the gate while the operator is driving animals down a chute associated with the gate.

These and other objects are achieved according to the present invention by providing a livestock sorting gate having: a chute forming a path for guiding animals to be sorted; a pair of pens disposed in opposed relation laterally of the path formed by the chute for receiving animals from the chute; and a gate mounted in the chute adjacent the pens for selectively blocking access to at least one of the pens. The gate includes three sides pivotally connected together in series, with one of the sides disposed between the other two sides. The latter are pivotally mounted at fixed pivots on respective lateral edges of the path formed by the chute, with these fixed pivots being points lying on a fourth side of the gate, such that the three sides form partially a four-bar linkage swingable transversely of the path formed by the chute. Preferably, the two flanking sides of the three sides forming the gate are substantially equal in length, with the linkage thus being a parallel crank four-bar linkage.

The gate also includes a motor in the form of a linear fluid motor, and the like, pivotally connected to the centrally disposed one of the sides and to an enjoining one of the flanking sides of the gate for swinging the gate transversely of the path formed by the chute by varying an angle included between the sides to which the motor is connected. A remote control unit is connected to the motor for actuating same from a location remote from the motor. In particular, it is contemplated by the invention that the remote control unit be mounted on the handle of a sorting pole used by an operator of the gate for driving livestock along the path formed by the chute so as to sort the livestock into the pens access to which is controlled by the sorting gate according to the invention.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a schematic, top plan view showing the livestock sorting gate of FIG. 1.

FIG. 5 is an enlarged, fragmentary, sectional view taken generally along the line 5—5 of FIG. 4.

FIG. 6 is an enlarged, fragmentary, perspective view showing the lower left hand corner of FIG. 3 looking from the center of the latter figure.

FIG. 7 is an enlarged, fragmentary, sectional view taken generally along the line 7—7 of FIG. 6.

FIG. 8 is a fragmentary, schematic, elevational view showing a sorting pole provided with a remote control unit for operating a sorting gate according to the present invention.

DESCRIPTION OF THE PREFERRED EMBODIMENTS

Figure 1:
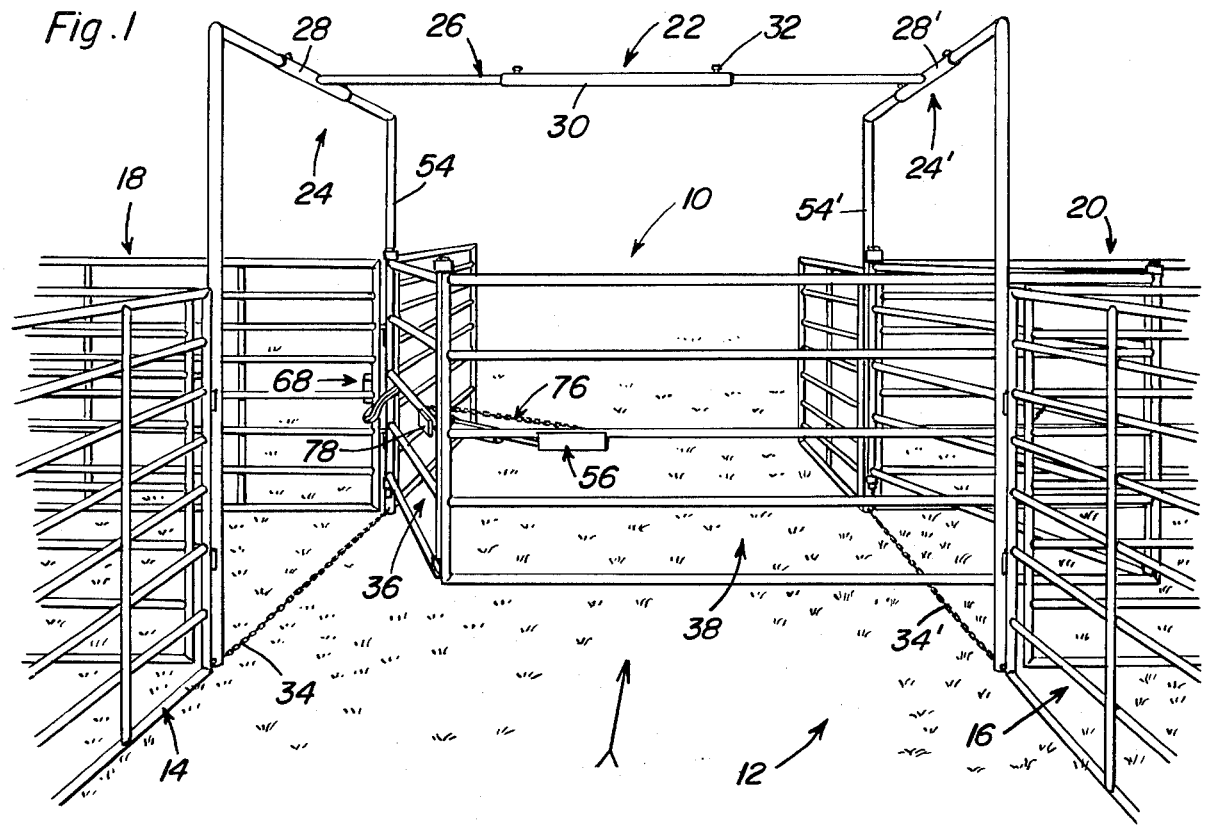
FIG. 1 is a fragmentary, schematic, front elevational view showing a livestock sorting gate according to the present invention.
Figure 3:
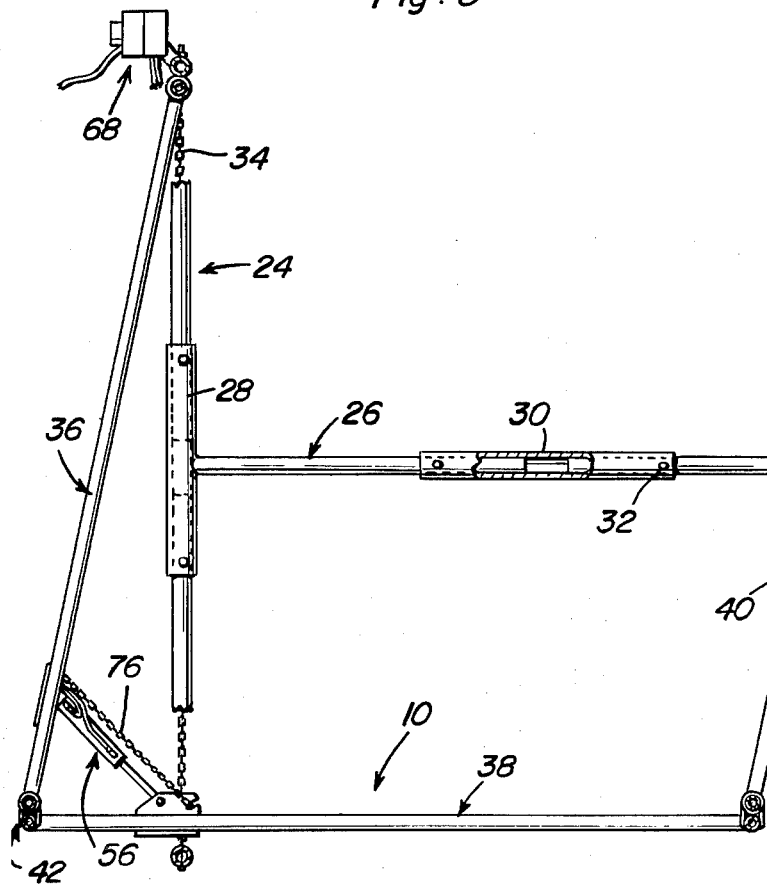
FIG. 3 is an enlarged, fragmentary, top plan view, partly cut away and in section, view, showing the livestock sorting gate of FIGS. 1 and 2.
Figure 4:
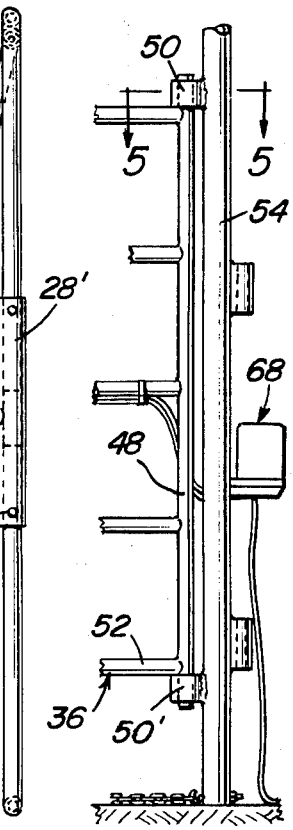
FIG. 4 is an enlarged, fragmentary, side elevational view, showing the upper left corner of FIG. 3.

Referring now more particularly to FIGS. 1 through 7 of the drawings, a livestock sorting gate 10 according to the present invention is shown in conjunction with a chute 12 forming a path bounded by fences 14 and 16 for guiding animals, such as cattle C into a selected one of a pair of pens 18 and 20 disposed in opposed relation to one another laterally of the path formed by chute 12. As can be seen from the drawings, the pens 18 and 20 are formed in a conventional manner by three sections of fence so as to be open along the path formed by chute 12 and having disposed at their open sides a gateway 22 including a pair of substantially U-shaped frames 24 and 24' connected together by an adjustable brace 26. As perhaps can best be seen from FIG. 3, each of the frames 24, 24' and brace 26 is formed in a pair of sections so as to permit both the width of the openings of the pens 18, 20 and the spacing of the openings of the pens 18 and 20 from one another to be varied as desired. Associated with the frames 24, 24' and brace 26 so as to adjustably connect the sections of same together are sleeves 28, 28' and 30, respectively, provided with a plurality of suitable apertures (not shown) arranged for permitting the pins 32 to retain the sleeves 28, 28' and 30 in a desired relationship with respect to the adjoining sections of the frames 24, 24' and brace 26. Chains 34 and 34' extend across the bottom or open end of the frames 24, 24', respectively, so as to bias the free ends of the frames 24, 24' toward one another. By this arrangement, a simple yet rigid gateway structure is formed at the entrances of pens 18 and 20.

Arranged within the path formed by chute 12 and adjacent, or between, the pens 18 and 20 for selectively blocking access to at least one of the pens 18, 20 is the sorting gate 10 according to the invention. Although gate 10 is shown as being of a fixed size, it will be appreciated that adjustable fence sections may be employed with gate 10 in the manner of frames 24 and 24' and brace 26 in order to permit adjustment of the size of gate 10 to correspond to a desired spacing of the width of the open sides of pens 18 and 20 and the spacing between the open sides of these pens.

Sorting gate 10 includes three sides 36, 38, and 40 pivotally connected together in series, with side 38 being disposed between the sides 36 and 40. The latter two sides are pivotally mounted at fixed pivots on respective lateral edges of the path formed by chute 12, with these fixed pivots being points on the line of a fourth side of the sorting gate 10, such that the three sides 36, 38 and 40 form partially a four-bar linkage swingable transversely of the path formed by chute 12. More specifically, the flanking sides 36 and 40 of sorting gate 10 are substantially equal in length, with the resulting linkage being a parallel crank four-bar linkage.

Side 38 is connected to the adjoining sides 36 and 40 as by the links 42, 42' each consisting of a bracket portion affixed to posts 44 of the central side 38, and having attached to this bracket portion a ring which slidably receives a post 46 of the adjoining flanking side 38, 40. In addition, the end post 48 of sides 36 and 40, being at the longitudinally spaced end from the post 46, is pivotally inserted into collars 50 and 50', with the lower rail 52 abutting against collar 50', and the collars 50, 50' being in turn affixed to a post 54, 54' forming one leg of the respective frames 24 and 24'. In this manner, the collars 50, 50' form the fixed pivots referred to above about which the sides 36 and 40 swing in the manner of cranks of a four-bar linkage.

Sorting gate 10 further includes a motor assembly 56 connected to sides 36 and 38 for swinging gate 10 transversely of the path formed by chute 12. More specifically, the motor assembly 56 includes a conventional double-acting linear fluid motor 58 comprising a cylinder 60 pivotally connected to, for example, side 36 by a suitable bracket, and by a piston (not shown), the rod 62 of which is pivotally connected to side 38 as by the generally U-shaped bracket 64 affixed to one of the rails of side 38. By this arrangement, it can be appreciated that extending and contracting motor 58 will vary the angle A (FIG. 2) included between sides 36 and 38 so as to cause the gate 10 to swing toward and away from the pens 18 and 20 and selectively permit access to these pens 18, 20.

Fluid under pressure, preferably a conventional hydraulic fluid, is fed into the end portions of cylinder 60 as by conventional lines 66 connected to a pump unit 68 conveniently located on post 54 of frame 24. This pump unit 68 is in turn connected by means of an electrical cable 70, and the like, to a suitable remote control unit 72 of conventional construction and mounted conveniently on a sorting pole 74 (FIG. 8). By this arrangement, an operator O (FIG. 2) can use the sorting pole 74 to facilitate driving cattle C down the path formed by chute 12 while simultaneously actuating double-acting the motor 58, in order to selectively block and unblock entrance to the pens 18 and 20.

An adjustable chain 76 is connected between sides 36, 38, or 38, 40 (not shown), in a manner not shown, to serve as a stop when the sorting gate 10 is moved so an animal can enter a pen 18, 20 and other animals cannot crowd the opening provided by the sorting gate 10. This is the situation shown by both the solid and broken lines in FIG. 2. That is, only one animal can pass through the opening thus formed at a time. Further, with two adjustable chains, such as chain 76, in each of the corners formed by the three sides 36, 38, 40, in the manner seen in FIG. 2, sorting gate 10 can be operated manually by varying the lengths of the respective chains.

While shown as a fence section, it is to be understood that side 40 of gate 10 can be constructed as a blind or solid panel for the operator O to stand behind at the backside of gate 10, opposite the side which the animals approach the pens 18 and 20, for the purpose of maneuvering the sorting gate either right or left by hand when the gate is manually actuated.

It will be appreciated that the sides 36 and 40 may also be constructed in a manner different from the fence sections shown if so desired, it being only necessary that the sides form wall portions of the resulting gate.

A reinforcing strap 78 can be provided on one of the rails of side 36, 40 where cylinder 60 is attached thereto in order to make the side 36, 40 stronger at this point.

As can be appreciated from the above description and from the drawings, a sorting gate according to the present invention results in substantial savings in labor and time. One man can do the work of three men without risk of accident to the lone operator. In addition, the construction of the gate permits adjustment of the resulting sorting system for various applications and situations.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A livestock sorting gate system, comprising, in combination:
    (a) a chute forming a path for guiding animals to be sorted;
    (b) a pair of pens disposed in opposed relation laterally of the path formed by the chute for receiving animals from the chute;
    (c) gate means mounted blocking the path formed by the chute and arranged adjacent the pens for selectively blocking access to at least one of the pens, the gate means including three sides pivotally connected together in series, with one of the sides disposed between the other two sides, and the other two sides pivotally mounted at fixed pivots on respective lateral edges of the chute, the fixed pivots of the other two sides being points lying along the line of a fourth side of the gate means, such that the gate means is in the form of four-bar linkage swingable transversely of the path formed by the chute; and
    (d) motor means attached to the gate means for controlling movement of the gate means.

2. A structure as defined in claim 1, wherein the other two sides of the three sides of the gate means are substantially equal in length, the linkage being a parallel crank four-bar linkage.

3. A livestock sorting gate system, comprising, in combination:
    (a) a chute forming a path for guiding animals to be sorted;

(b) a pair of pens disposed in opposed relation laterally of the path formed by the chute for receiving animals from the chute; and (c) gate means mounted blocking the path formed by the chute and arranged adjacent the pens for selectively blocking access to at least one of the pens, the gate means including three sides pivotally connected together in series, with one of the sides disposed between the other two sides, and the other two sides pivotally mounted at fixed pivots on respective lateral edges of the chute, the fixed pivots of the other two sides being points lying along the line of a fourth side of the gate means, such that the gate means is in the form of four-bar linkage swingable transversely of the path formed by the chute, the gate means further including motor means connected to the one of the sides and one of the other two sides for swinging the gate means transversely of the path formed by the chute.

4. A structure as defined in claim 3, wherein the gate means further includes control means connected to the motor means for actuating the motor means from a location remote from the motor means.

5. A structure as defined in claim 3, wherein the motor means includes a linear fluid motor pivotally connected to and arranged extending between the one of the sides and the adjoining one of the other two sides of the gate means for varying an angle included between the sides of the gate means to which the motor is connected.

6. A structure as defined in claim 5, wherein the gate means still further includes control means connected to the motor for actuating the motor from a location remote from the motor.

7. For use in conjunction with a chute forming a path for guiding animals, and a pair of pens disposed in opposed relation laterally of the path formed by the chute for receiving animals from the chute, a gate comprising, in combination, three sides pivotally connected together in series, with one of the sides disposed between the other two sides, and the other two sides pivotally mounted at fixed pivots on respective lateral edges of the chute, the fixed pivots of the other two sides being points on a line of a fourth side of the gate, such that the gate is in the form of a four-bar linkage swingable transversely of the path formed by the chute, and motor means attached to the gate for controlling movement of the gate.

8. For use in conjunction with a chute forming a path for guiding animals, and a pair of pens disposed in opposed relation laterally of the path formed by the chute for receiving animals from the chute, a gate comprising, in combination, three sides pivotally connected together in series, with one of the sides disposed between the other two sides, and the other two sides pivotally mounted at fixed pivots on respective lateral edges of the chute, the fixed pivots of the other two sides being points on a line of a fourth side of the gate, such that the gate is in the form of a four-bar linage swingable transversely of the path formed by the chute, the gate further including motor connected to the one of the sides and one of the other two sides for swinging the gate means transversely of the path formed by the chute.

9. A structure as defined in claim 8, wherein the motor means includes a linear fluid motor pivotally connected to and arranged extending between the one of the sides of the adjoining one of the other two sides of the gate for varying an angle included between the sides of the gate to which the motor is connected.

* * * * *